(12) United States Patent
Jang et al.

(10) Patent No.: US 8,989,711 B2
(45) Date of Patent: Mar. 24, 2015

(54) APPARATUS AND METHOD FOR REGISTRATION OF MOBILE STATION TO COMPACT BASE STATION USING RFID IN A BROADBAND WIRELESS COMMUNICATION SYSTEM

(75) Inventors: Byoung-Gi Jang, Suwon-si (KR); Jeong-Dae Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1274 days.

(21) Appl. No.: 12/125,371

(22) Filed: May 22, 2008

(65) Prior Publication Data

US 2008/0293420 A1 Nov. 27, 2008

(30) Foreign Application Priority Data

May 25, 2007 (KR) .............................. 2007-0050740

(51) Int. Cl.
  *H04Q 7/00* (2006.01)
  *H04W 36/04* (2009.01)
(52) U.S. Cl.
  CPC ..................................... *H04W 36/04* (2013.01)
  USPC ..................... 455/412.1; 455/412.2; 455/444; 455/456.1; 455/552.1; 340/12.51
(58) Field of Classification Search
  CPC ...... H04W 36/04; H04W 48/02; H04W 48/20
  USPC ............... 455/422.1, 435.1, 435.2, 436–444, 455/456.1, 412.1, 412.2, 552.1; 340/12.51
  See application file for complete search history.

(56) References Cited

U.S. PATENT DOCUMENTS

| 7,142,861 | B2 * | 11/2006 | Murai ........................... 455/444 |
| 7,606,533 | B2 * | 10/2009 | Perttila et al. ................ 455/41.2 |
| 2005/0019656 | A1 | 1/2005 | Yoon et al. |
| 2005/0130646 | A1 * | 6/2005 | Frank et al. ................. 455/426.1 |
| 2006/0094405 | A1 * | 5/2006 | Dupont ...................... 455/414.1 |
| 2006/0128384 | A1 * | 6/2006 | Jagadeesan et al. .......... 455/436 |
| 2007/0114280 | A1 * | 5/2007 | Coop et al. .................... 235/385 |
| 2007/0202866 | A1 * | 8/2007 | Tsuchiya ................... 455/422.1 |

FOREIGN PATENT DOCUMENTS

| KR | 10-2001-0107028 A | 12/2001 |
| KR | 10-2006-0128135 A | 12/2006 |

* cited by examiner

*Primary Examiner* — Ajit Patel
*Assistant Examiner* — Julio Perez
(74) *Attorney, Agent, or Firm* — Jefferson IP Law, LLP

(57) ABSTRACT

An apparatus and method for registration of a Mobile Station (MS) to a compact Base Station (BS) using Radio Frequency IDentification (RFID) in a broadband wireless communication system are provided. The method includes receiving RFID tag information of the MS from an RFID receiver, determining whether the MS is a service registration mobile station using the received RFID tag information, and if the MS is a service registration mobile station, performing a serving BS change into the compact BS for the MS and then initiating a service for the MS.

11 Claims, 5 Drawing Sheets

APPARATUS AND METHOD FOR REGISTRATION OF MOBILE STATION TO COMPACT BASE STATION USING RFID IN A BROADBAND WIRELESS COMMUNICATION SYSTEM

PRIORITY

This application claims the benefit under 35 U.S.C. §119 (a) of a Korean patent application filed in the Korean Intellectual Property Office on May 25, 2007 and assigned Serial No. 2007-50740, the entire disclosure of which is hereby incorporated by reference.

BACKGROUND OF THE INVENTION

1. Field of the Invention

The present invention relates generally to a broadband wireless communication system. More particularly, the present invention relates to an apparatus and method for registration of a Mobile Station (MS) to a compact Base Station (BS) using Radio Frequency IDentification (RFID) in a broadband wireless communication system.

2. Description of the Related Art

Currently, a broadband wireless communication system has been developed to deploy a compact BS in order to complement a macro BS. The compact BS refers to a home or Small Office Home Office (SOHO) base station that is installed in an area in which a Quality of Service (QoS) is poor because the area is out the service coverage area of the macro BS or otherwise can only obtain a weak signal. The compact BS is classified into a home or office BS and an enterprise BS. Similar to the macro BS, the compact BS provides a portable Internet service to MSs, but has features such as a low output, a low capacity, and a low price so that it is optimized for a small-scaled indoor use such as a home or SOHO. Accordingly, the compact BS has to interwork with the macro BS and an existing MS has to be able to perform communications between the compact BS and the macro BS while being provided with a service. That is, the MS has to be able to be provided with a better service by performing handover between the macro BS and the compact BS according to a wireless environment.

With the features of low output, low capacity, low price, etc. of compact BS, compact BSs can be installed relatively more in a specific area. This may cause a problem that an MS frequently performs handover from a macro BS to a compact BS or from a compact BS to a macro BS while moving. Also, there is a problem that the number of neighboring BSs that should be under management of a macro BS and compact BS may increase, thus resulting in a waste of BS resources. Also, there is a problem that an undesired one of the MSs may violate the service coverage area of the compact BS because all MSs located in a service coverage area of a compact BS may receive signals from the compact BS.

Thus, there is a need for a method of an efficient operation between a macro BS and a compact BS. In other words, there is a need for a method for allowing only an MS registered to a compact BS to receive a service of the compact BS and preventing the compact BS from having an influence on other services.

SUMMARY OF THE INVENTION

An aspect of the present invention is to address at least the above-mentioned problems and/or disadvantages and to provide at least the advantages described below. Accordingly, an aspect of the present invention is to provide an apparatus and method for registration of a Mobile Station (MS) to a compact Base Station (BS) using Radio Frequency IDentification (RFID) in a broadband wireless communication system.

Another aspect of the present invention is to provide an apparatus and method for efficient operation between a macro BS and a compact BS, for allowing only an MS registered to the compact BS to receive a service of the compact BS and preventing the occurrence of frequent handover from the macro BS to the compact BS according to a movement of an MS in a broadband wireless communication system.

Further another aspect of the present invention is to provide an apparatus and method for handover from a macro BS to a compact BS in a broadband wireless communication system.

The above aspects can be achieved by providing an apparatus and method for registration of an MS to a compact BS using RFID in a broadband wireless communication system.

According to an aspect of the present invention, an operating method of a compact Base Station (BS) for handover of a Mobile Station (MS) in a broadband wireless communication system is provided. The method includes receiving Radio Frequency IDentification (RFID) tag information of the MS from an RFID receiver, determining whether the MS is a service registration mobile station using the received RFID tag information, and if the MS is a service registration mobile station, performing a serving BS change into the compact BS for the MS and then initiating a service for the MS.

According to another aspect of the present invention, an operating method of a macro Base Station (BS) for handover of a Mobile Station (MS) in a broadband wireless communication system is provided. The method includes receiving information on an MS from a compact BS that belongs to the macro BS, determining whether the MS is a mobile station having connected to the macro BS using the received MS information, and if the MS is a mobile station having connected, performing a serving BS change into the compact BS and then terminating a service for the MS.

According to further another aspect of the present invention, a method for transmitting Radio Frequency IDentification (RFID) tag information by an RFID receiver in a broadband wireless communication system is provided. The method includes determining whether a Mobile Station (MS) with an RFID tag enters a service coverage area of a compact Base Station (BS) associated with the RFID receiver, and if the MS with the RFID tag enters the service coverage area of the compact BS, transmitting RFID tag information of the MS to the compact BS.

According to yet another aspect of the present invention, an apparatus for handover of a Mobile Station (MS) in a broadband wireless communication system is provided. The apparatus includes the MS, the compact BS and the macro BS. The MS has registered to a compact BS, and receives a service from the compact BS when entering a service coverage area of the compact BS according to its movement in the middle of receiving a service from a macro BS in connection with the macro BS. The compact BS performs a serving BS change into the compact BS for the MS and then initiates a service for the MS when the registered MS enters its own service coverage. When the MS enters a service coverage area of the compact BS, the macro BS performs a serving BS change into the compact BS for the MS and then terminates a service for the MS in the middle of providing the service to the MS.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other objects, features and advantages of certain exemplary embodiments of the present invention will become more apparent from the following description taken in conjunction with the accompanying drawings in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions or constructions are omitted for clarity and conciseness.

An apparatus and method for registration of a Mobile Station (MS) to a compact Base Station (BS) using Radio Frequency IDentification (RFID) in a broadband wireless communication system according to exemplary embodiments of the present invention are described below.

Exemplary embodiments of present invention support general handover from a compact BS to a macro BS, but do not support general handover from the macro BS to the compact BS. In place of the general handover, a method proposed in an exemplary embodiment of the present invention can achieve better performance and solve a conventional problem.

Figure 1:
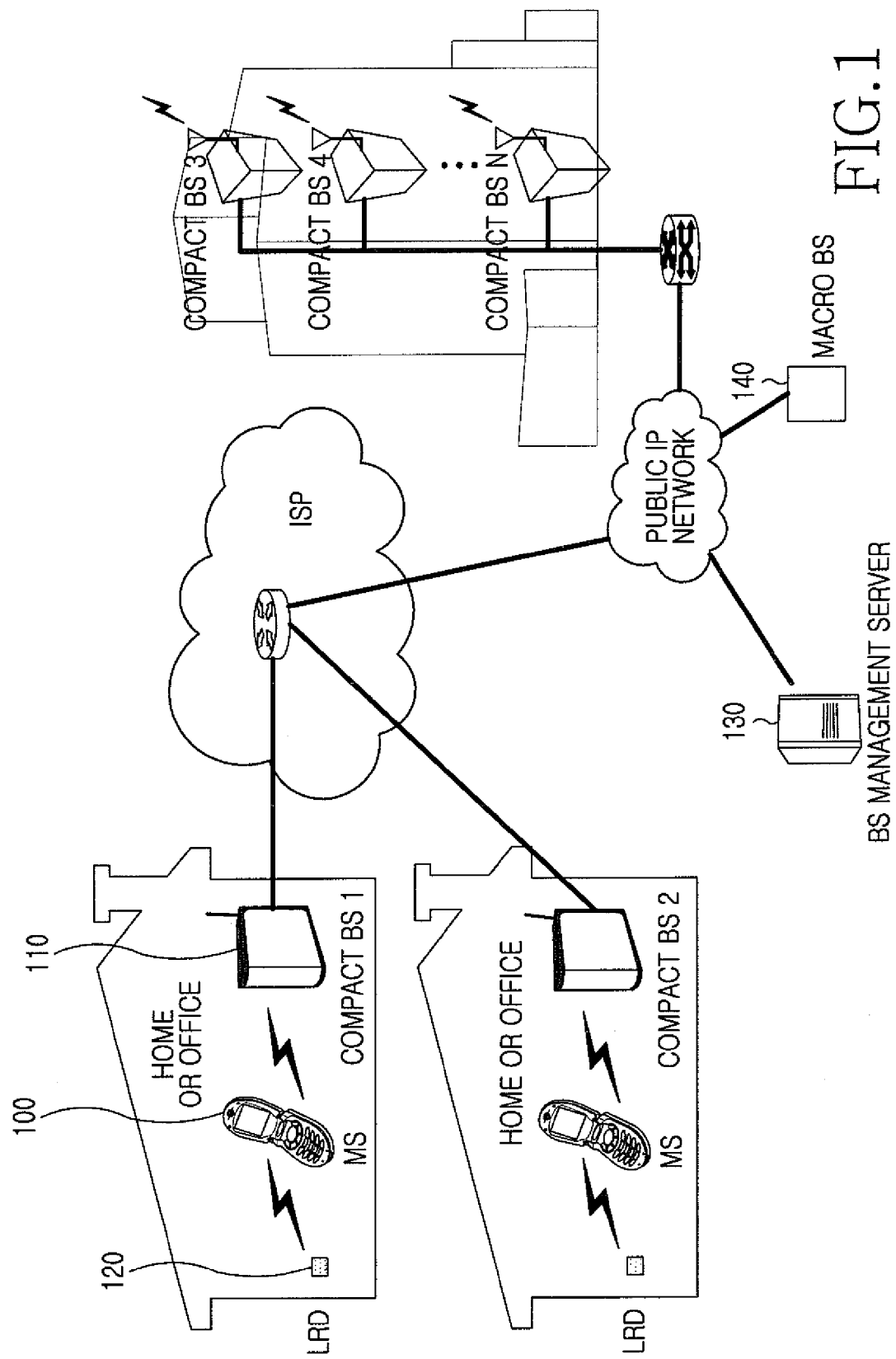
FIG. 1 is a diagram illustrating a network construction of a broadband wireless communication system according to an exemplary embodiment of the present invention.

FIG. 1 is a diagram illustrating a network construction of a broadband wireless communication system according to an exemplary embodiment of the present invention.

As shown in FIG. 1, the broadband wireless communication system includes an MS 100, a compact BS 110, a Local Registration Device (LRD) 120, a BS management server 130 and a macro BS 140.

Referring to FIG. 1, the MS 100 connects to the macro BS 140 and receives a portable Internet service from the macro BS 140. If the MS 100 moves and enters a service coverage area of the compact BS 110, hereafter, the MS 100 receives a portable Internet service from the compact BS 110. The MS 100 refers to a mobile station having registered to the compact BS 110 and is equipped with a proper RFID tag.

The compact BS 110 communicates with the LRD 120 to which it is associated. If the MS 100 registered to the compact BS 110 enters the service coverage area of the compact BS 110, the compact BS 110 receives a service acknowledgement for the MS 100 from the macro BS 140 to which the compact BS 110 belongs, and provides a portable Internet service to the MS 100.

The LRD 120 is associated with the compact BS 110. The LRD 120 recognizes the RFID tag of the MS 100 entering the service coverage area of the compact BS 110, using RFID that is a local area wireless communication technology, and transmits the recognized RFID tag information to the compact BS 110. Accordingly, The LRD 120 informs that the MS 100 is currently located in the service coverage area of the compact BS 110.

The BS management server 130 supports Internet Protocol (IP) setup for BSs and system setup such as image downloading, and monitors and manages states of the BSs that are in operation.

The macro BS 140 refers to a base station covering a wide service coverage area including service coverage areas of one or more compact BSs 110. The macro BS 140 provides a portable Internet service to the MS 100 when the MS 100 is connected. When receiving a request for a service acknowledgement for the MS 100 from the compact BS 110, the macro BS 140 acknowledges the request, thereby allowing the MS 100 to receive a portable Internet service through the compact BS 110.

Figure 2:
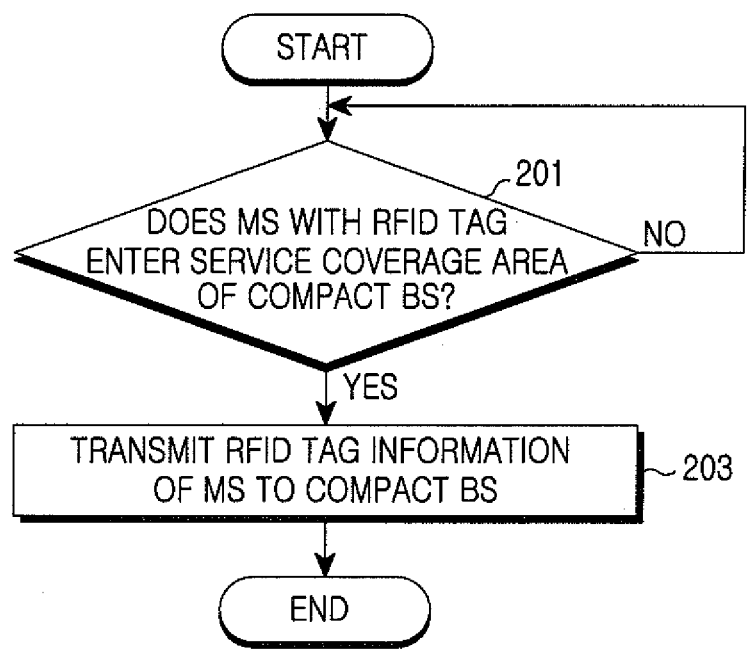
FIG. 2 is a flowchart illustrating a process of a Local Registration Device (LRD) for transmitting Radio Frequency IDentification (RFID) tag information in a broadband wireless communication system according to an exemplary embodiment of the present invention.

FIG. 2 is a flowchart illustrating a process of an LRD for transmitting RFID tag information in a broadband wireless communication system according to an exemplary embodiment of the present invention.

Referring to FIG. 2, in step 201, the LRD 120 associated with a compact BS 110 determines whether an MS 100 with an RFID tag enters a service coverage area of the compact BS 110. The LRD 120 recognizes the MS 100 entering the service coverage area of the compact BS 110 by identifying the RFID tag of the MS 100 using RFID that is a local area communication technology. Thus, an MS with no RFID tag cannot receive a portable Internet service of the compact BS 110 because the LRD 120 cannot recognize the MS with no RFID tag.

If the MS 100 with the RFID tag enters the service coverage area of the compact BS 110, the LRD 120 transmits the RFID tag information of the MS 100 to the compact BS 110 in step 203 such that the MS 100 can receive a portable Internet service of the compact BS 110. Information exchange between the LRD 120 and the compact BS 110 can be implemented using a wired or wireless connection. If the MS 100 with the RFID tag does not enter the service coverage area of the compact BS 110, the LRD 120 returns to and repeatedly performs the step 201.

Then, the LRD 120 terminates the process of an exemplary embodiment of the present invention.

Figure 3:
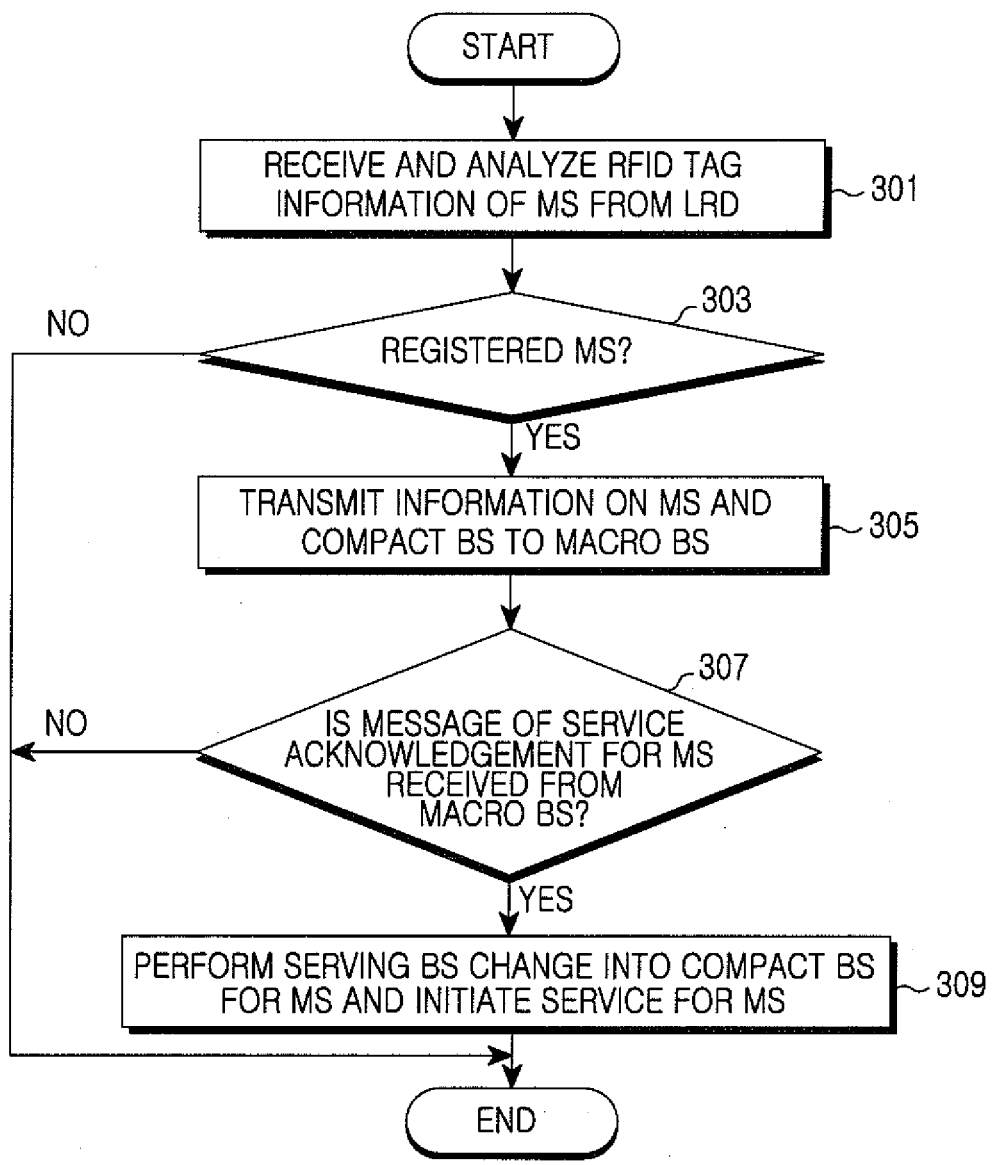
FIG. 3 is a flowchart illustrating a process of a compact BS for registering a Mobile Station (MS) to the compact BS in a broadband wireless communication system according to an exemplary embodiment of the present invention.

FIG. 3 is a flowchart illustrating a process of a compact BS for registering an MS to the compact BS in a broadband wireless communication system according to an exemplary embodiment of the present invention.

Referring to FIG. 3, in step 301, a compact BS 110 receives RFID tag information of an MS 100 from an LRD 120 associated with the compact BS 110 and analyzes the received RFID tag information. Then, the compact BS 110 determines whether the MS 100 is a service registration mobile station using the analyzed RFID tag information in step 303. If the MS 100 is not a service registration mobile station, the compact BS 110 terminates the process of an exemplary embodiment of the present invention.

If the MS 100 is a service registration mobile station, in step 305, the compact BS 110 transmits information about the MS 100 and about itself to a macro BS 140 to which the compact BS 110 belongs. The information on the MS 100 includes a Media Access Control (MAC) address that is mapped to the RFID tag information of the MS 100. The information on the compact BS 110 includes a frequency and an IP address of the compact BS 110.

Then, in step 307, the compact BS 110 determines whether it receives a service acknowledgement message for the MS 100 from the macro BS 140. The service acknowledgement message is a message for informing that the MS 100 is a mobile station having connected to the macro BS 140 and acknowledging a service conversion into the compact BS 110 for the MS 100. If the service acknowledgement message is not received, the compact BS 110 terminates the process of an exemplary embodiment of the present invention. If the service acknowledgement message is received, in step 309, the compact BS 110 performs a serving BS change from the macro BS 140 to the compact BS 110 for the MS 100 and then initiates a service for the MS 100.

Then, the compact BS 110 terminates the process of an exemplary embodiment of the present invention.

Figure 4:
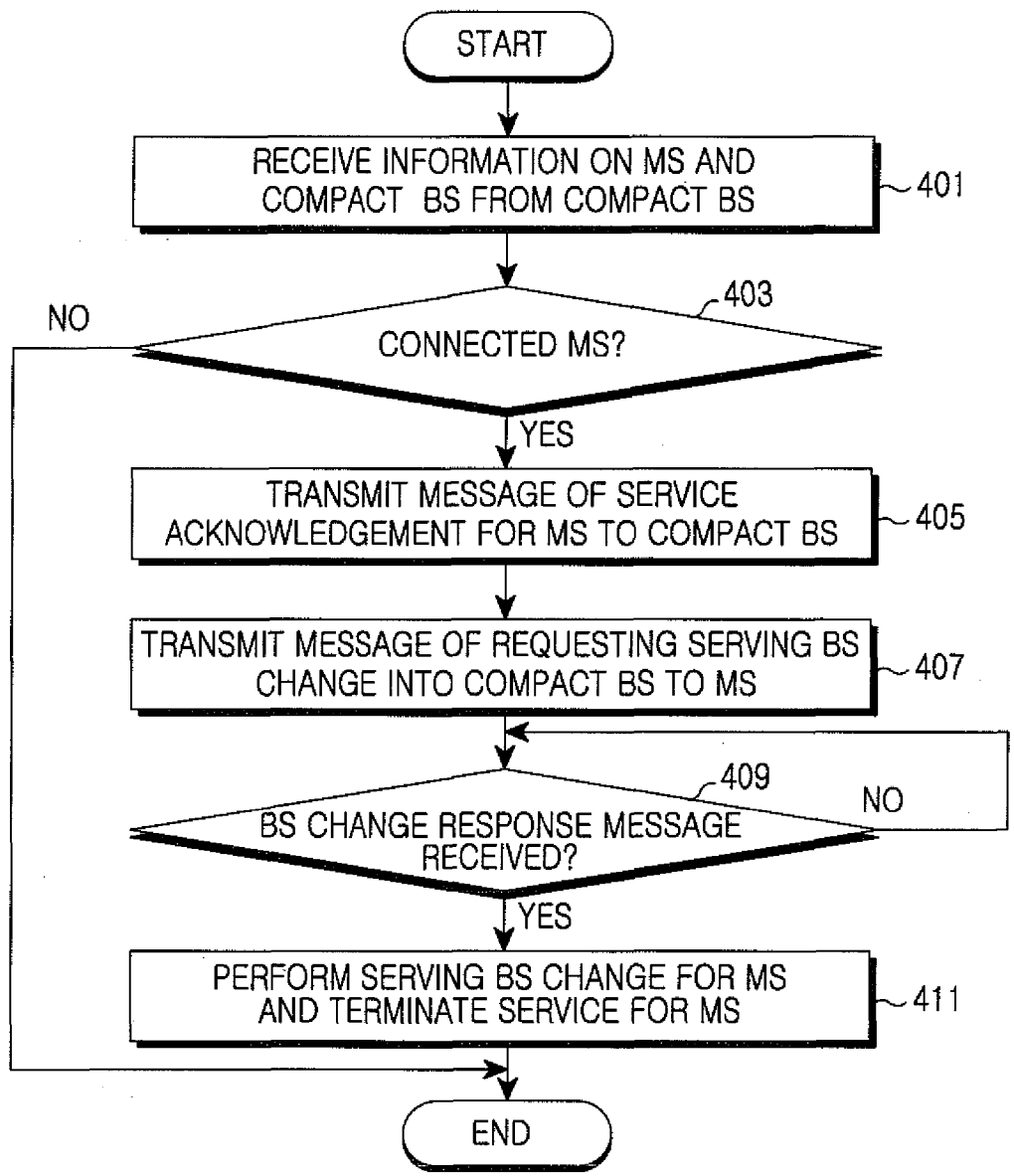
FIG. 4 is a flowchart illustrating a process of a macro BS for registering an MS to a compact BS in a broadband wireless communication system according to an exemplary embodiment of the present invention.

FIG. 4 is a flowchart illustrating a process of a macro BS for registering an MS to a compact BS in a broadband wireless communication system according to an exemplary embodiment of the present invention.

Referring to FIG. 4, in step 401, a macro BS 140 receives information on an MS 100 and a compact BS 110 that belongs to the macro BS 140, from the compact BS 110. In step 403, the macro BS 140 determines whether the MS 100 is a mobile station that is connected to the macro BS 140. In other words, the macro BS 140 determines whether the MS 100 is a mobile station that presently performs a network entry and is in service in the service coverage area of the macro BS 140. The information on the MS 100 includes an MAC address that is mapped to RFID tag information of the MS 100. The information on the compact BS 110 includes a frequency and an IP address of the compact BS 110.

If the MS 100 is not a mobile station connected to the macro BS 140, that is, if the MS 100 is not a mobile station that is in service in the service coverage area of the macro BS 140, the macro BS 140 terminates the process of the exemplary embodiment of the present invention. If the MS 100 is a mobile station having connected to the macro BS 140, the macro BS 140 transmits a service acknowledgement message for the MS 100 to the compact BS 110 in step 405. The service acknowledgement message is a message for informing that the MS 100 is a mobile station having connected to the macro BS 140 and acknowledging a service conversion into the compact BS 110 for the MS 100.

Then, in step 407, the macro BS 140 transmits a message of requesting a serving BS change into the compact BS 110 to the MS 100. The BS change request message is a message for informing that the MS 100 is a mobile station registered to the compact BS 110 and sending a BS change request such that the MS 100 receives a portable Internet service from the compact BS 110 hereafter.

Then, the macro BS 140 determines whether it receives a BS change response message from the MS 100 in step 409. If the BS change response message is received, in step 411, the macro BS 140 performs a serving BS change from the macro BS 140 to the compact BS 110 for the MS 100 and then terminates a service for the MS 100. If the BS change response message is not received, the macro BS 140 returns to and repeatedly performs the step 409.

Then, the macro BS 140 terminates the process of an exemplary embodiment of the present invention.

Figure 5:
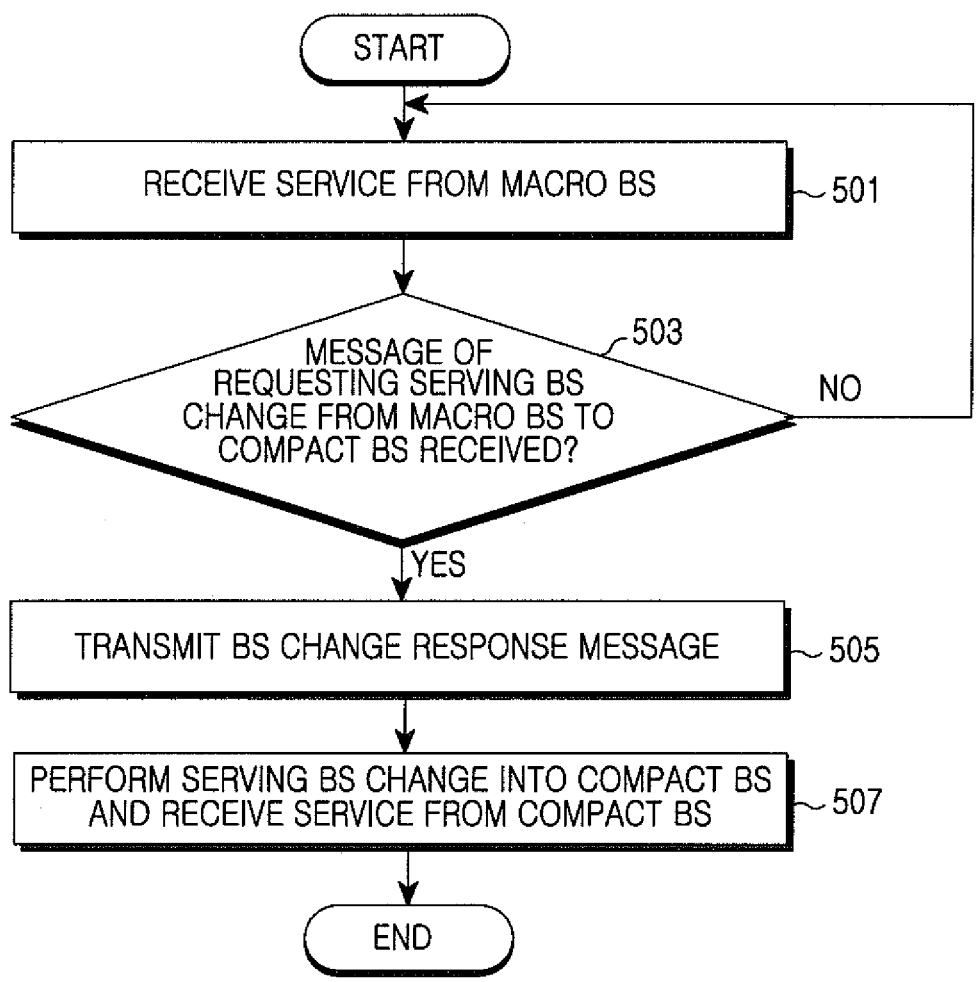
FIG. 5 is a flowchart illustrating a process of an MS for registering the MS to a compact BS in a broadband wireless communication system according to an exemplary embodiment of the present invention.

FIG. 5 is a flowchart illustrating a process of an MS for registering the MS to a compact BS in a broadband wireless communication system according to an exemplary embodiment of the present invention.

Referring to FIG. 5, in step 501, an MS 100 receives service from a macro BS 140. Then, in step 503, the MS 100 determines whether it receives a message requesting a serving BS change from the macro BS 140 to a compact BS 110. The BS change request message is a message for informing that the MS 100 is a mobile station having registered to the compact BS 110 and sending a BS change request such that the MS 100 will receive a portable Internet service from the compact BS 110 hereafter.

If the BS change request message is not received, the MS 100 returns to step 501. If the BS change request message is received, the MS 100 transmits a BS change response message to the macro BS 140 in step 505. In step 507, the MS 100 performs a serving BS change from the macro BS 140 to the compact BS 110 and then receives a service from the compact BS 110.

Then, the MS 100 terminates the process of an exemplary embodiment of the present invention.

As described above, the present invention provides an apparatus and method for registration of an MS to a compact BS using RFID in a broadband wireless communication system. Thus, there is an advantage of preventing the occurrence of frequent handover from a macro BS to a compact BS according to the MS's movement, because an MS previously registered to a compact BS can receive a service of the compact BS only through an LRD and an MS passing near the compact BS with no registration to the compact BS cannot receive a service of the compact BS. Also, because of a feature of the compact BS, many BSs can be deployed easily, simply, and conveniently. That all these BSs are stored and operated in a neighbor list by one BS is a waste of resources and inefficient. However, the present invention does not support general handover from the macro BS to the compact BS and therefore, the macro BS does not have to recognize the compact BS as a neighboring BS. Thus, the macro BS can advantageously save resources and provide an efficient service. Also, the present invention can provide a service for only an MS registered to the compact BS in a service coverage area of the compact BS, thus being capable of preventing a service violation of an MS not registered. This improves a QoS for the registered MS.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An operating method of a compact Base Station (BS) in a wireless communication system, the method comprising:

receiving Radio Frequency IDentification (RFID) tag information of a Mobile Station (MS) from an RFID receiver while the MS is communicating with a macro BS;

determining whether the MS is a mobile station registered with the compact BS, using the received RFID tag information;

if the MS is a mobile station registered with the compact BS, performing a serving BS change from the macro BS to the compact BS for the MS and then initiating a service for the MS;

facilitating communication between the wireless communication system and the MS only if the MS is a mobile station registered with the compact BS; and if the MS is a mobile station registered with the compact BS, transmitting information on the MS to the macro BS, wherein the serving BS change for the MS is performed at the time a message of service acknowledgement for the MS is received from the macro BS, wherein the compact BS is connected to the macro BS, and wherein the information on the MS comprises a Media Access Control (MAC) address mapped to the RFID tag information of the MS.

2. The method of claim 1, wherein the service acknowledgement message comprises a message for informing that the MS is a mobile station having connected to the macro BS and acknowledging a service change into the compact BS for the MS.

3. An operating method of a Mobile Station (MS) in a wireless communication system, the method comprising:
registering with a compact Base Station (BS), the registering including transmitting Radio Frequency ID (RFID) information of an RFID tag of the MS to the compact BS;

while communicating with a macro BS, entering within a service coverage area of the compact BS to which the MS is registered such that the RFID tag of the MS is readable by an RFID receiver associated with the compact BS;

receiving a message from the macro BS requesting a service change from the macro BS to the compact BS;

performing a service BS change from the macro BS to the compact BS;

terminating communications with the macro BS; and communicating with the wireless communication system via the compact BS, wherein the macro BS receives information on the MS from the compact BS, wherein the serving BS change for the MS is performed at the time a message of service acknowledgement for the MS is received from the macro BS, and wherein the information on the MS comprises a Media Access Control (MAC) address mapped to the RFID tag information of the MS.

4. The method of claim 3, further comprising: transmitting a BS change response to the macro BS.

5. An operating method of a macro Base Station (BS) in a wireless communication system, the method comprising:
while providing service from a Mobile Station (MS), receiving information about the MS and information about a compact Base Station (BS) to which the MS is registered from the compact BS, the information about the MS relating to Radio Frequency Identification (RFID) tag information of an RFID tag of the MS;

transmitting a service acknowledgement message to the compact BS; transmitting a serving BS change request message to the MS; receiving a BS change response message from the MS;

performing a service change for the MS from the macro BS to the compact BS;

terminating a service with the MS in response to successfully performing the service change; and if the MS is a mobile station registered with the compact BS, transmitting information on the MS to the macro BS, wherein the serving BS change for the MS is performed at the time a message of service acknowledgement for the MS is received from the macro BS, wherein the MS is registered with the compact BS, and wherein the information on the MS includes a Media Access Control (MAC) address mapped to the RFID tag of the MS.

6. The method of claim 5, wherein the service acknowledgement message comprises a message indicating that the MS is a mobile station having connected to the macro BS and acknowledging a service change into the compact BS for the MS.

7. A compact Base Station (BS) comprising:
a communication unit configured to communicate with a macro BS and a Mobile Station (MS) in a wireless communication network;

a Radio Frequency IDentification (RFID) receiver configured to determine whether an MS associated with an RFID tag registered with the compact BS enters the service coverage area of the compact BS, and to generate RFID tag information of the MS when the MS enters the service coverage area of the compact BS; and a processor configured to determine whether the MS enters a service coverage area of the compact BS based on the determination of the RFID receiver, to determine whether the MS is a service registration mobile station based on the RFID tag information, to transmit information on the MS to a macro BS to which the compact BS belongs if the MS is the service registration mobile station, and to perform a serving BS change for the MS from the macro BS to the compact BS when a message of service acknowledgement is received from the macro BS, wherein if the MS is a mobile station registered with the compact BS, the processor transmits information on the MS to the macro BS, wherein the serving BS change for the MS is performed at the time the message of service acknowledgement for the MS is received from the macro BS, and wherein the information on the MS comprises a Media Access Control (MAC) address mapped to the RFID tag information of the MS.

8. The compact BS of claim 7, wherein the service acknowledgement message comprises a message for informing that the MS is a mobile station having connected to the macro BS and acknowledging a service change into the compact BS for the MS.

9. A Mobile Station (MS), comprising: a Radio Frequency IDentification (RFID) tag; a communication unit configured to communicate with a macro Base Station (BS) and a compact BS to which the MS is registered in a wireless communication system, and to receive a message from the macro BS requesting a service change from the macro BS to the compact BS after the MS enters within a service coverage area of the compact BS while communicating with the macro BS; and a processor configured to register with the compact BS, to perform a service BS change from the macro BS to the compact BS is response to reception of the message from the macro BS, and to terminate communication with the macro BS upon completion of the service BS change, wherein the MS enters into the service coverage area of the compact BS when the RFID tag of the MS is readable by an RFID receiver associated with the compact BS, wherein information on the MS is transmitted from the compact BS to the macro BS, wherein the serving BS change for the MS is performed at the time a message of service acknowledgement for the MS is received from the macro BS, and wherein the information on the MS comprises a Media Access Control (MAC) address mapped to the RFID tag information of the MS.

10. The MS of claim 9, wherein the communication unit is further configured to transmit a BS change response message to the macro BS.

11. A macro Base Station (BS) comprising:

a communication unit configured to communicate with a Mobile Station (MS) and a compact Base Station (BS) to which the MS is registered, in a wireless communication system, to receive information about the MS and information about the compact BS from the compact BS to which the MS is registered, the information about the MS relating to Radio Frequency Identification (RFID) tag information of an RFID tag of the MS; and a processor configured to control the communication unit to transmit a service acknowledgement message to the compact BS, to control the communication unit to transmit a serving BS change request message to the MS, to perform a service change for the MS from the macro BS to the compact BS in response to receiving a BS change response message from the MS, and to terminate a service with the MS upon successfully performing the service change, wherein the MS is registered with the compact information, wherein the information on the MS includes a Media Access Control (MAC) address mapped to the RFID tag of the MS, and wherein the service acknowledgement message comprises a message indicating that the MS is a mobile station having connected to the macro BS and acknowledging a service change into the compact BS for the MS.

* * * * *